Figure 1:
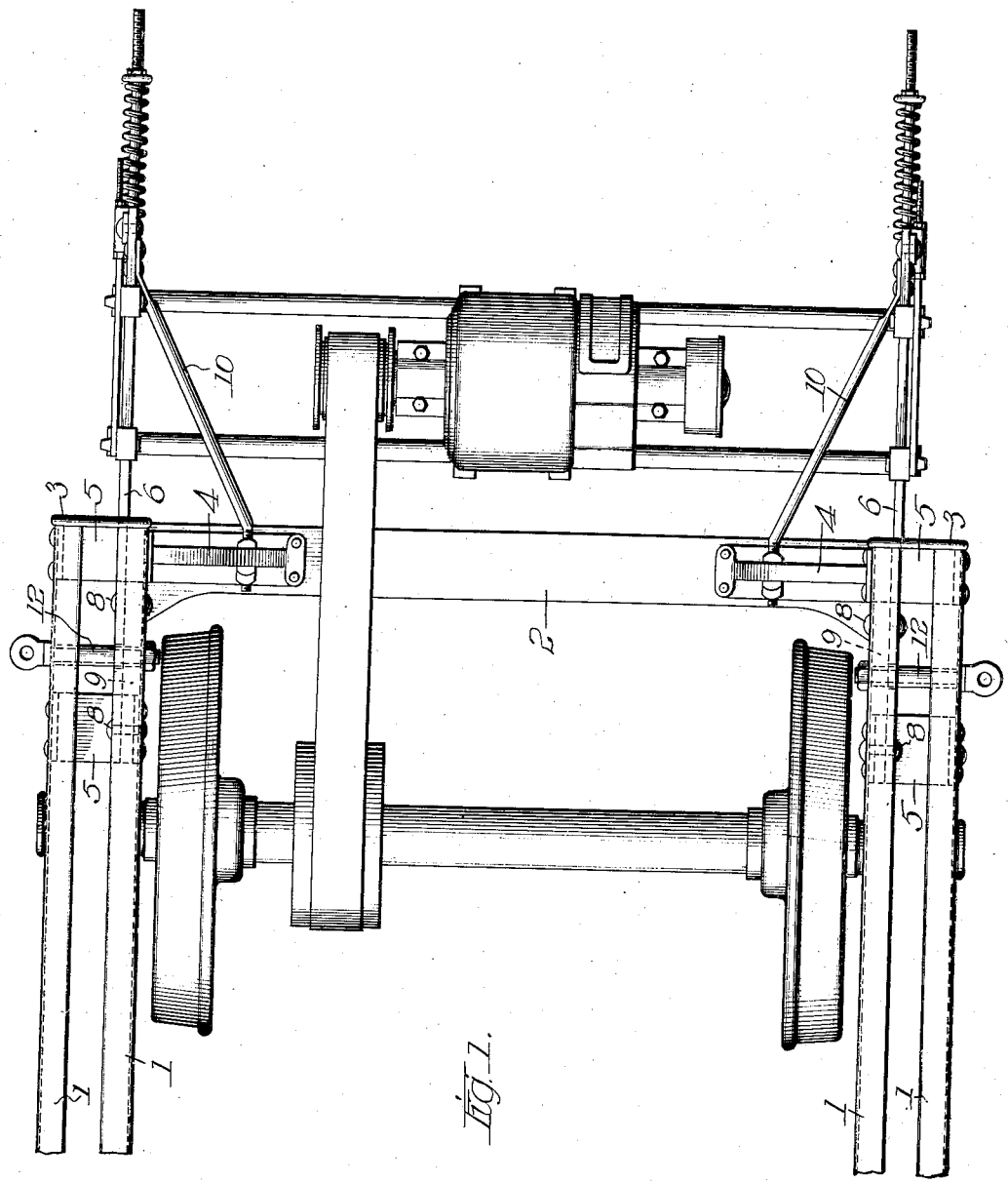

W. L. BLISS.
GENERATOR SUSPENSION.
APPLICATION FILED MAY 25, 1911. RENEWED JUNE 2, 1913.

1,188,398.

Patented June 27, 1916.
3 SHEETS—SHEET 1.

Witnesses:

Inventor
William L. Bliss,
by Edwin B. H. Tower, Jr.
Atty.

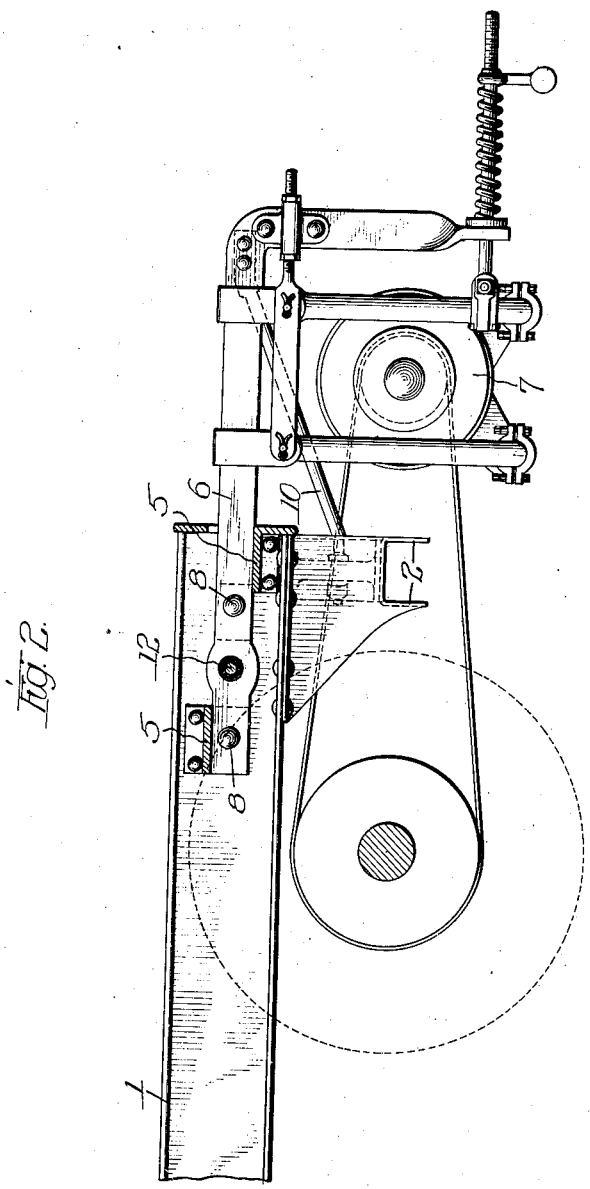

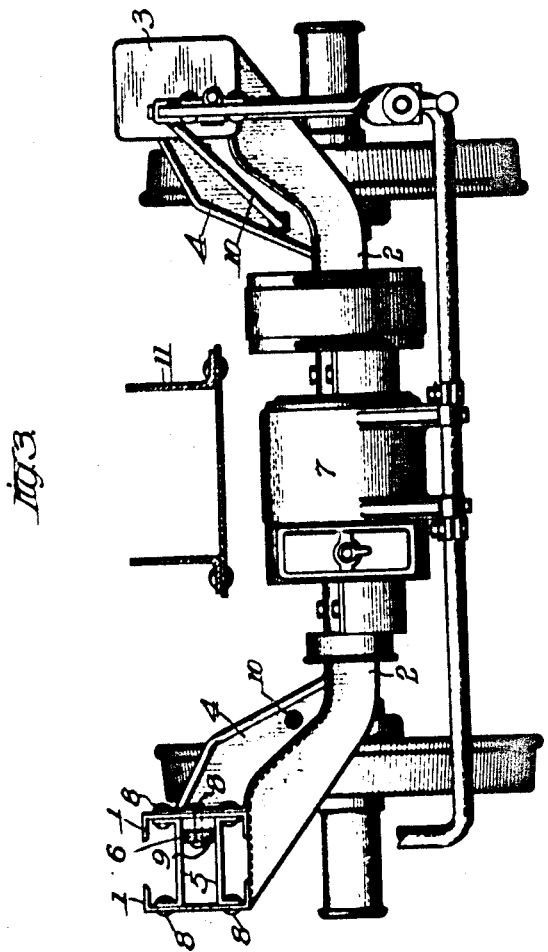

UNITED STATES PATENT OFFICE.

WILLIAM L. BLISS, OF NIAGARA FALLS, NEW YORK, ASSIGNOR, BY MESNE ASSIGNMENTS, TO U. S. LIGHT AND HEAT CORPORATION, OF NIAGARA FALLS, NEW YORK, A CORPORATION OF NEW YORK.

GENERATOR SUSPENSION.

1,188,398.  Specification of Letters Patent.  Patented June 27, 1916.

Application filed May 25, 1911, Serial No. 629,327. Renewed June 2, 1913. Serial No. 771,338.

*To all whom it may concern:*

Be it known that I, WILLIAM L. BLISS, a citizen of the United States, residing at Niagara Falls, in the county of Niagara and State of New York, have invented new and useful Improvements in Generator Suspensions, of which the following is a full, clear, concise, and exact description, reference being had to the accompanying drawing, forming a part of this specification.

My invention relates to generator suspensions of the general type illustrated in my co-pending applications, Serial No. 491,704, filed April 23rd, 1909, and Serial No. 565,267, filed June 6th, 1910, and certain features of the present invention are covered in said applications.

One of the objects of the present invention is to provide means for applying a generator suspension to a car truck having outer steel channel members, in such a manner as to take advantage of certain structural features of the channel members without materially weakening the same or detracting from their main functions.

Another object of this invention is to provide a generator suspension in which the suspension bars bear directly against certain abutments which thereby relieve the securing rivets from any shearing stresses.

A further object is to provide a generator suspension adapted to be readily applied to a car truck frame of the box girder type.

The accompanying drawings illustrate a practical and successful embodiment of the invention. Other embodiments, however, are contemplated.

In the drawings:—Figure 1 is a top plan view of a portion of a truck having a generator suspension applied thereto in accordance with the preferred construction referred to. Fig. 2 is a side elevation thereof partly in section. Fig. 3 is an end elevation thereof partly in section.

The car truck illustrated comprises substantially parallel outer box girder members, each built up of the facing channel bers, 1, 1, these box girder members being connected by the end sill 2 which has its center portion depressed considerably below the level of said box girder members. The outer ends of the channel members are provided with a cap 3 and reinforced by the knee pieces 4. The channel members 1 are also held in fixed, spaced relation by the short channel sections 5 riveted thereto. There are two of these short channel sections secured in each box girder member, constituting abutments for the suspension bars 6. One abutment on each side is located adjacent the outer end of the box girder, the other abutments being located at some distance from the ends of said box girders.

The suspension bars 6, adjacent their middle portions, rest on and are supported by the outer abutments, the inner ends of said suspension bars being arranged beneath the inner abutments and bearing upwardly against the same. The generator 7 is carried by the outer ends of said suspension bars 6, in any desired manner. It is apparent, therefore, that the weight of the generator tends to maintain the relative position of the parts without the necessity of auxiliary fastening devices, the suspension bars 6 acting as levers secured at their inner ends and fulcrumed between said inner ends and the outer weighted ends. In order to afford ample security, said suspension bars 6 are riveted to the inner pair of channel members 1 by rivets 8 which pass through the spacing block 9. These rivets, however, are not subjected to any material shearing stresses in view of the direct co-operation between the suspension bars 6 and the abutments 5. Diagonal braces 10 are also provided which reinforce the outer ends of the suspension bars without impeding access to the generator. These diagonal braces are preferably riveted to said suspension bars adjacent the outer ends thereof and are also secured to the reinforcing knees 4.

The particular construction by which the generator is carried by the outer ends of the suspension bars need not be described specifically, as other constructions might be employed in lieu thereof, if desired. The construction, however, is such that the generator may be readily adjusted in various ways and may also be readily removed from the swinging frame which supports it, and furthermore, it is readily accessible for inspection and adjustment.

In Fig. 3 a girder 11 is shown in section. This girder projects downwardly from the floor of the car where the cars are of steel construction, and is illustrated for the purpose of showing that proper clearance between said girder and generator and car truck, is maintained with the form of construction illustrated. The depressed end sill 2, referred to above, insures ample clearance at this point.

It should be noted that ample clearance is provided between the suspension bars 6 and the pins 12, which latter constitute features of the box girder car truck. By virtue of this clearance, the suspension bars 6 are free to flex upwardly slightly, if impelled to do so by the weight of the generator. The suspension bars pass loosely through the openings in the end caps 5.

I do not desire to limit myself to the details of construction described herein, as this embodiment of the invention was selected for the purpose of illustration only. I desire therefore, to cover suitable equivalent means for effecting the desired result in other ways.

What I claim as new and desire to secure by Letters Patent of the United States is:—

1. In combination, a car truck having steel channel members, two abutments spaced apart in each of said members, a suspension bar adjacent each member passing over one of said abutments and under the other of said abutments, and a generator carried by the outer end of said suspension bars whereby said bars bear downwardly on the outer abutments and upwardly against the inner abutments to maintain said bars and generator in proper relation.

2. A generator suspension comprising a car truck having substantially parallel box girders, a plurality of bridging members secured in each of said box girders, suspension bars each passing over one of said bridging members and under the other and projecting beyond the ends of said box girders, and a generator carried by the projecting ends of said suspension bars.

3. A generator suspension comprising a car truck having substantially parallel outer members each comprising a pair of channel members, two channel-shaped pieces riveted to each of said pairs of channel members and maintaining the same in fixed spaced relation, substantially parallel suspension bars arranged between said channel members, one suspension bar being associated with each pair of said channel members and passing over one of said channel pieces and under the other of said channel pieces, whereby said suspension bars are adapted to support a generator at their outer ends without auxiliary fastening devices, and a spacing block between each suspension bar and one of said channel members.

4. In combination, a car truck provided with side girders forming the sides of said truck, a suspension bar supported by each side girder, and generator supporting means carried wholly by said suspension bars.

5. In combination, a steel car truck provided with side girders, a pair of suspension bars, one carried by each girder, rests for said suspension bars secured to said girders, said bars passing over one rest and beneath another, the free ends of said bars projecting beyond the end of the truck, and generator supporting means carried by said free ends.

In witness whereof, I have hereunto subscribed my name in the presence of two witnesses.

WILLIAM L. BLISS.

Witnesses:
E. P. HANNIG,
WM. A. TURBAYNE.